United States Patent
Youn et al.

(10) Patent No.: US 12,387,018 B2
(45) Date of Patent: Aug. 12, 2025

(54) BEHAVIOR MODEL OF PHOTODETECTORS WITH A BUILT-IN LOOKUP TABLE

(71) Applicant: HEWLETT PACKARD ENTERPRISE DEVELOPMENT LP, Houston, TX (US)

(72) Inventors: Jinsung Youn, Milpitas, CA (US); Xiaoge Zeng, Milpitas, CA (US); Mir Ashkan Seyedi, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1109 days.

(21) Appl. No.: 17/084,600

(22) Filed: Oct. 29, 2020

(65) Prior Publication Data

US 2022/0138371 A1 May 5, 2022

(51) Int. Cl.
| | |
|---|---|
| G06G 7/48 | (2006.01) |
| G06F 16/901 | (2019.01) |
| G06F 30/20 | (2020.01) |
| G01J 1/44 | (2006.01) |

(52) U.S. Cl.
CPC .......... *G06F 30/20* (2020.01); *G06F 16/9017* (2019.01); *G01J 1/44* (2013.01); *G01J 2001/4466* (2013.01)

(58) Field of Classification Search
CPC . G01J 1/44; G01J 2001/4466; G06F 16/9017; G06F 2119/06; G06F 2119/08; G06F 2119/18; G06F 30/20; G06F 30/367
See application file for complete search history.

(56) References Cited

U.S. PATENT DOCUMENTS

| | | | |
|---|---|---|---|
| 7,574,342 B2 | 8/2009 | Kundert | |
| 10,503,865 B2 | 12/2019 | Alloatti | |
| 2007/0057160 A1* | 3/2007 | Kaku | H04B 10/66 |
| | | | 250/214 R |
| 2009/0204381 A1* | 8/2009 | Ma | G06F 30/20 |
| | | | 703/13 |
| 2011/0282639 A1* | 11/2011 | Obradovic | G06F 30/367 |
| | | | 703/14 |
| 2011/0313748 A1* | 12/2011 | Li | G06F 30/30 |
| | | | 703/14 |
| 2018/0006728 A1* | 1/2018 | Yuda | H04B 10/40 |

OTHER PUBLICATIONS

Chen, Sao-Jie, et al. "Modeling and simulation of Quantum-Well infrared photodetectors." 2016 29th IEEE International System-on-Chip Conference (SOCC). IEEE, 2016.*

(Continued)

*Primary Examiner* — Nithya J. Moll
(74) *Attorney, Agent, or Firm* — Sheppard Mullin Richter & Hampton LLP

(57) ABSTRACT

A method for simulating a photodetector behavior includes: receiving an input waveform for an photodetector; receiving an input optical power and a reverse bias voltage for the photodetector; searching for, in a lookup-table library, model parameters for a photodetector behavior model based on the input optical power and the reverse bias voltage; and outputting a second waveform from the photodetector behavior model, where the second waveform is indicative of an electrical response of the photodetector receiving the input waveform.

20 Claims, 7 Drawing Sheets

(56) References Cited

OTHER PUBLICATIONS

Mena, Pablo V., et al. "Circuit-level model of semiconductor photodetectors." Proc. of SPIE, Physics and Simulation of Optoelectronic Devices 7.3625 (2003): 560.*

Piels, Molly, Anand Ramaswamy, and John E. Bowers. "Nonlinear modeling of waveguide photodetectors." optics Express 21.13 (2013): 15634-15644.*

Li, Zhen, et al. "An Energy-Efficient Reconfigurable Nanophotonic Computing Architecture Design: Optical Lookup Table." 2017 IEEE International Conference on Rebooting Computing (ICRC). IEEE, 2017. (Year: 2017).*

Fahrenkopf, N. M. et al., "The AIM Photonics MPW: A Highly Accessible Cutting Edge Technology for Rapid Prototyping of Photonic Integrated Circuits", IEEE Journal of Selected Topics in Quantum Electronics, Aug. 20, 2019, 6 pgs., vol. 25, No. 5, IEEE.

Martin, P. et al., "Development of Verilog-A Models for Silicon Photonics Devices and Implementation in a Standard EDA Environment", Mar. 28-29, 2014; 21 pgs., LETI, London, UK.

Martin, P. et al., "Modeling of Silicon Photonics Devices with Verilog-A", Proc. 29th International Conference on Microelectronics (MIEL 2014), May 12-14, 2014, pp. 209-212, IEEE, Belgrade, Serbia.

* cited by examiner

US 12,387,018 B2

BEHAVIOR MODEL OF PHOTODETECTORS WITH A BUILT-IN LOOKUP TABLE

DESCRIPTION OF RELATED ART

Devices of Silicon Photonics (SiPh) have been actively investigated and deployed for high-performance computing and data center applications to overcome electrical interconnect bottlenecks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

To lower the barriers for entry to SiPh design, one key enabler is a SiPh process design kit (PDK). As semiconductor device foundries can provide well-defined PDK having transistors and passive devices for electronic design, a SiPh PDK should offer user-friendly models for various photonic devices to run co-simulation with electronic circuitry. However, current SiPh PDK has been focused on device characterizations by extracting and fitting parameters from measurement results. In particular, among photonic devices, a photodetector (PD) is a noise-sensitive device because it converts a weak optical signal to small output currents. In addition, in order to obtain large output currents, a higher reverse bias voltage can be applied to the PD so that the PD is operated at avalanche regime. Therefore, the PD model should cover a wide bias voltage range and have statistical data to verify reliability of the PD and electronic circuitry.

Various embodiments disclosed herein provide a behavior model for PDs, which is an integral part of a SiPh PDK development. The disclosed PD behavior model is composed of a built-in lookup-table (LUT) library, a current-level determination part/algorithm, an optical-to-electrical (O/E) conversion part/algorithm, and an electrical parasitics part/algorithm. The LUT library contains lookup tables storing model parameters that are extracted by simulation and/or measurement at different reverse bias voltages ($V_R$) and input optical powers (Popt). Once PDK users enter a reverse bias voltage and an input optical power, the corresponding model parameters are automatically found and delivered to the current-level determination part, O/E conversion part, and electrical parasitics part with behavior modeling languages. The disclosed PD behavior model is easy to use and very intuitive from SiPh PDK's point of view. In some embodiments, the LUT library may include lookup tables implemented based on process and temperature variations such that PDK users can verify the PD model and run co-simulation with receiver circuitry at the different process and temperature conditions. These techniques allow optimization of a SiPh system and reliability verification.

Figure 1:
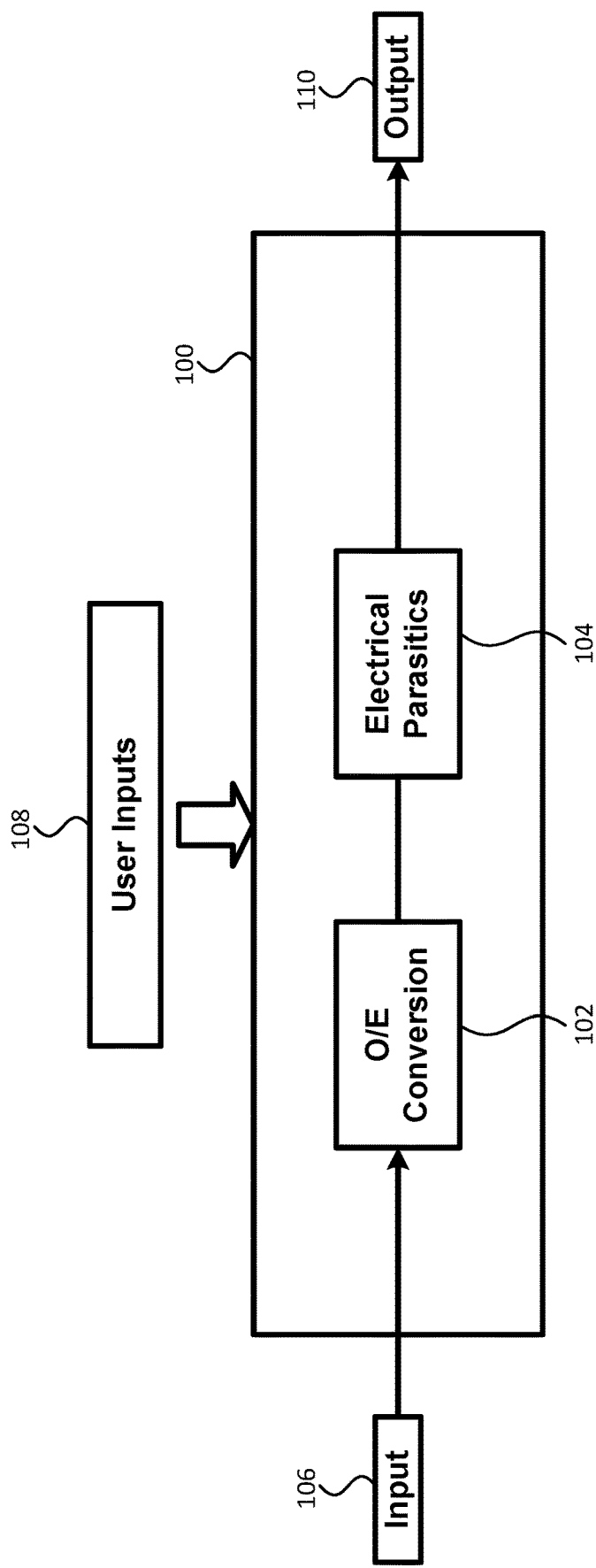
FIG. 1 is a diagram of an example photodetector behavior model.

FIG. 1 is a diagram of an example PD behavior model 100. The PD behavior model 100 includes an O/E conversion part 102 and an electrical parasitics part 104. The O/E conversion part 102 is configured to determine photo-generated carriers by diffusion and drift, while the electrical parasitics part 104 is configured to determine electrical parasitics by a drawing dimension. The PD behavior model 100 takes input 106 such as modulated signal and also receives user inputs 108 of model parameters for the O/E conversion part 102 and the electrical parasitics part 104. On those bases, the PD behavior model 100 generates an output 110 indicative of a simulated electrical response (e.g., electrical current) of the PD receiving the input 106. The user inputs 108 include model parameters for the O/E conversion part 102 and the electrical parasitics part 104 to perform their functions. In some embodiments, the model parameters may include multiplication factor, responsivity, resonance frequency, Q-factor, parasitic resistance/capacitance/inductance, etc.

When extracting various model parameters with different reverse bias voltages ($V_R$) and input optical powers ($P_{opt}$), the PD behavior model 100 may be capable of accurately generating simulated electrical responses for PDs. However, the PD behavior model 100 has limitations from the PDK perspective. For example, PDK users have to input lots of parameters to use the PD behavior model 100 for time- and frequency-domain simulations. Further, PDK users have to change the model parameter values manually when they want to simulate at other conditions (e.g. different reverse bias voltages and/or input optical powers).

Figure 2:
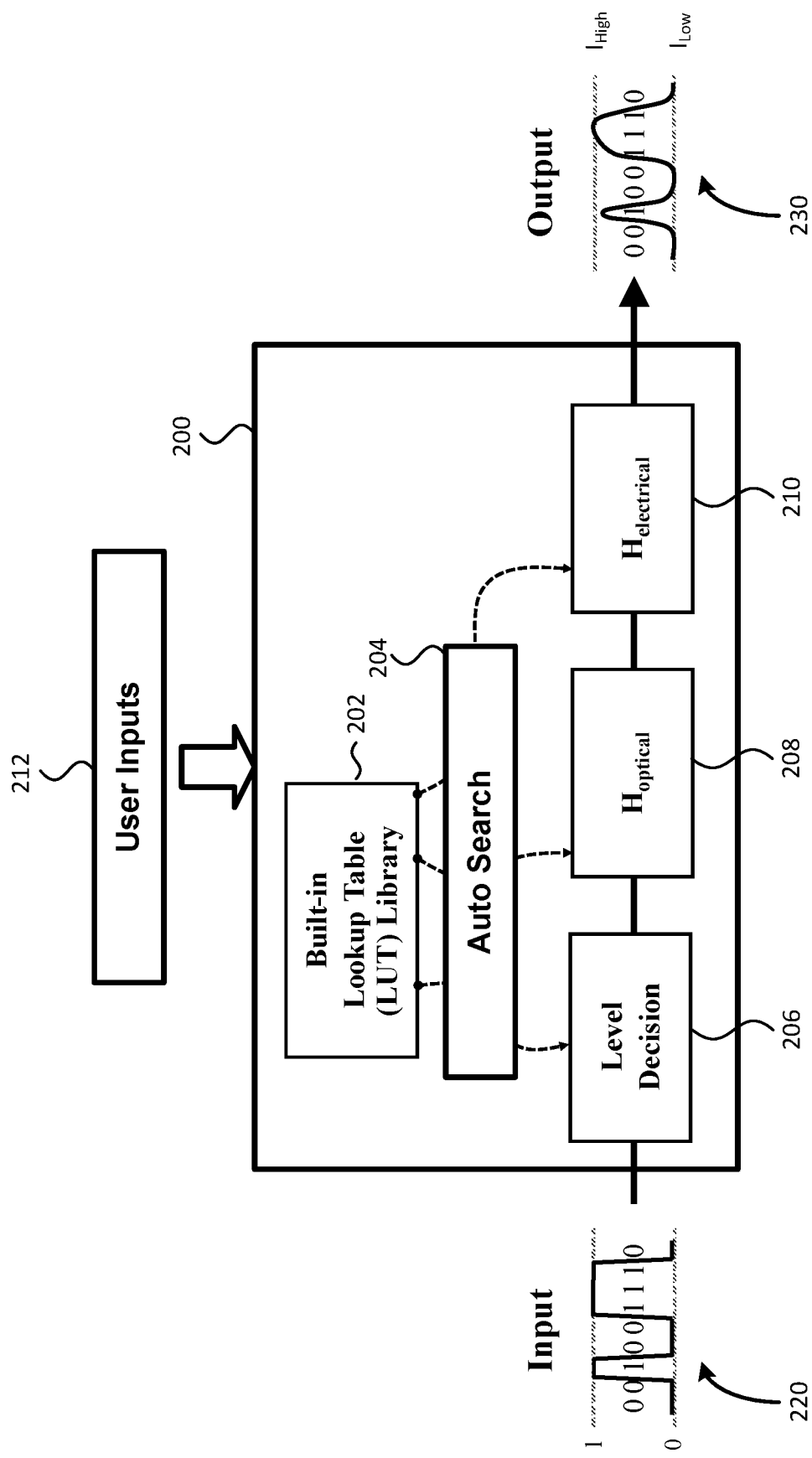
FIG. 2 is a diagram of a photodetector behavior model according to one example embodiment.
Figure 3:
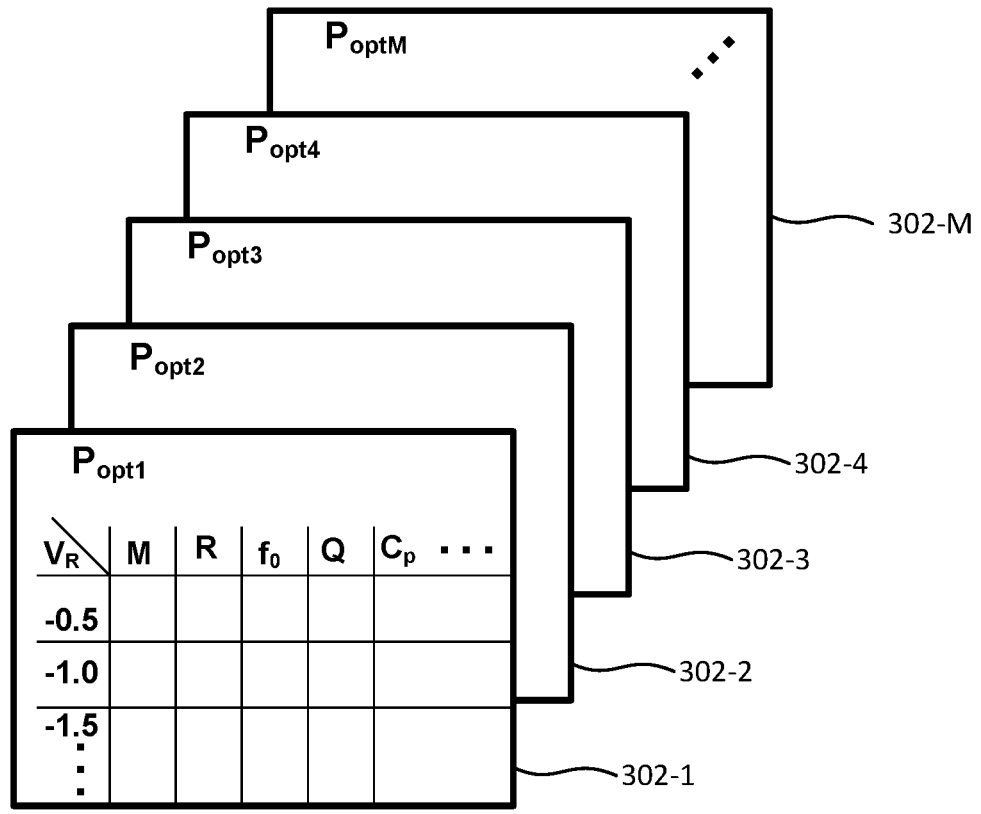
FIG. 3 illustrates a set of lookup tables storing model parameters for a photodetector behavior model according to an example embodiment.

FIG. 2 is a diagram of a PD behavior model 200 according to one example embodiment. The PD behavior model 200 includes a built-in lookup table (LUT) library 202, an automatic search (Auto Search) part/algorithm 204, a level decision part/algorithm 206, an O/E conversion part/algorithm 208 ($H_{optical}$), and an electrical parasitics part/algorithm 210 ($H_{electrical}$). The LUT library 202 is configured to store lookup tables for model parameters and their values (hereinafter "model parameters" indicating "model parameters and their values") for the level decision part 206, the O/E conversion part 208, and an electrical parasitics part 210. In some implementations, the lookup tables may be organized based on reverse bias voltages and input optical powers for PDs. FIG. 3 illustrates a set of lookup tables 302-1, 302-2, 302-3, 302-4, . . . , 302-M (generally, "the lookup table 302," collectively, "the lookup tables 302.") and example content stored on the lookup tables 302. In the example shown in FIG. 3, each of the lookup tables 302 stores model parameters for a different input optical power (e.g., $P_{opt1}$, $P_{opt2}$, $P_{opt3}$, $P_{opt4}$, ..., or $P_{optM}$). In each of the lookup tables 302, correspondences between a plurality of reverse bias voltages ($V_R$) and model parameters (e.g., M (multiplication factor), R (responsivity), $f_0$ (resonance frequency), Q (Q-factor), $C_p$ (parasitic capacitance), etc.) may be organized as a table. Thus, when given an input optical power and a reverse bias voltage, a set of corresponding model parameters can be identified from a corresponding lookup table 302. One of ordinary skill in the art would understand that the illustrated lookup tables 302 are provided merely as examples. Other ways to organize and store model parameters are contemplated. The model parameters stored in the lookup tables of the LUT library 202 may be obtained from simulation of one or more photodetectors or measurement of one or more physical photodetectors.

Referring back to FIG. 2, the automatic search part 204 is configured to receive the user inputs 212 and automatically search the built-in LUT library 202 to find corresponding model parameters for the level decision part 206, the O/E conversion part 208, and the electrical parasitics part 210. In various embodiments, the user inputs 212 include at least an input optical power and a reverse bias voltage. In various embodiments, after the automatic search part 204 receives the user inputs, to implement automatic search function, the automatic search part 204 can search the LUT library 202 for a lookup table (e.g., the lookup table 302-1) corresponding to the input optical power (e.g., $P_{opt1}$), and then look for model parameters on the lookup table based on the reverse bias voltage.

In various embodiments, the user inputs 212 may include process and/or temperature conditions. For example, a user may select a particular semiconductor process (e.g., a complementary metal-oxide-semiconductor process) that would be employed to manufacture the PD under the simulation in the PD behavior model 200. The semiconductor process yields different device characteristics due to process variations applied to a wafer to make multiple PDs. There may be process non-uniformity between the center and a corner edge of the wafer, resulting in different device characteristics. In one deposition step of the manufacturing process, for example, the deposition rate at the center of the wafer may be higher than the edges of the wafer such that a thickness of the deposited film (e.g., semiconductor film, metal film, dielectric film, etc.) at the center portion of the wafer is greater than that at the edges of the wafer. In addition, a user may select a particular operating temperature for the PD. The PD has different device characteristics at different operating temperatures. For example, a dark current of the PD may increase as operating temperature increases. These process and temperature variations may be reflected in the model parameters in the lookup tables.

Once the automatic search part 204 find model parameters based on the user inputs (e.g., an input optical power, a reverse bias voltage, a process corner, and/or an operating temperature), the automatic search part 204 then automatically delivers to each of the level decision part 206, the O/E conversion part 208, and the electrical parasitics part 210, model parameters employed by those parts to perform their functions. The level decision part 206 can obtain the input waveform 220 and, with the correct model parameters, determine a DC current level for the PD under simulation. The optical-electrical conversion part 208 then determines photo-generated carriers of the PD based on the DC current level, input optical power, the reverse bias voltage, and the model parameters. Further, the electrical parasitics part 210 can determine electrical parasitics for the PD. After these calculations, the PD behavior model 200 outputs a simulated electrical response (e.g., electrical currents) 230 of the PD.

In some embodiments, once the values of reverse bias voltages ($V_R$) and input optical powers ($P_{opt}$) are entered by the PDK users, the model parameters corresponding to the entered $V_R$ and $P_{opt}$ are automatically searched by the automatic search part 204 with behavior modeling languages (e.g. Verilog, VHDL, SystemVerilog, etc.) and delivered to the O/E conversion part 208 and the electrical parasitics part 210, respectively. As a result, the PD electrical output current 230 is generated and delivered to a receiver front-end circuit (e.g. transimpedance amplifier) (not shown).

Figure 4A:
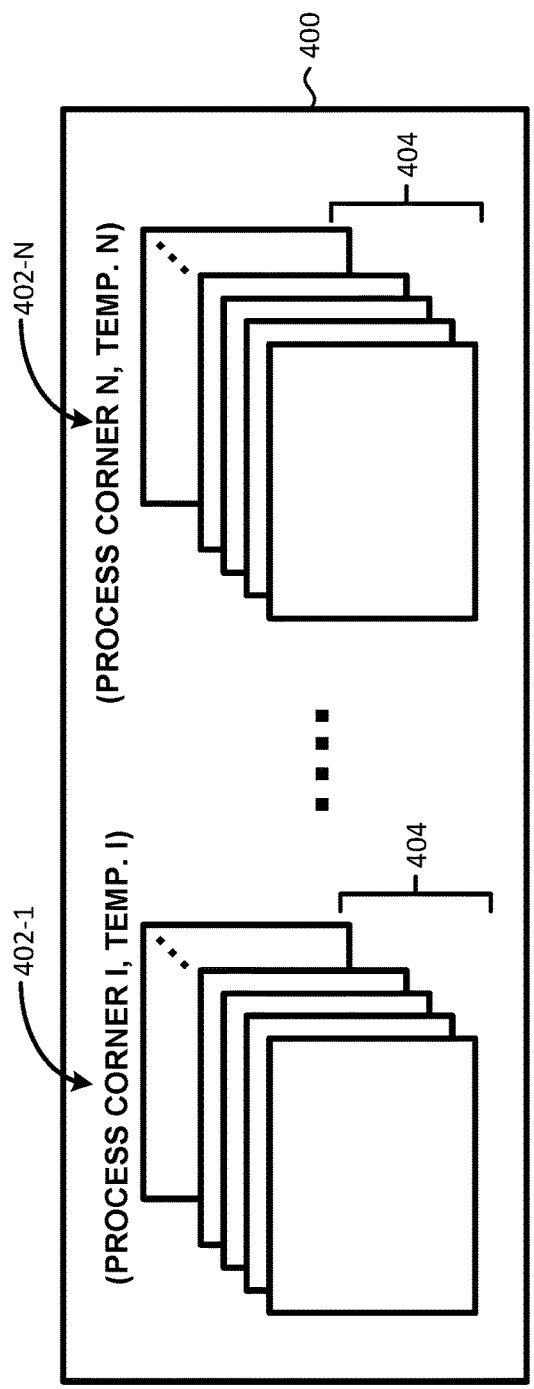
FIG. 4A is a diagram illustrating an example lookup-table library that includes multiple sets of lookup tables corresponding to various process and temperature conditions, according to an example embodiment.

In some embodiments, DC/AC characteristics of a PD are affected by process and temperature variations. Thus, PDK users want to run statistical simulations to verify reliability before the SiPh chip fabrication. To accommodate this requirement, the disclosed techniques are developed with additional functionalities. For example, in the PD behavior model 200, the LUT library 202 may be composed of additional lookup tables, which have model parameters derived with different process corners and operating temperatures as shown in FIG. 4A. FIG. 4A is a diagram illustrating an example LUT library 400 that includes multiple sets of lookup tables 402-1 ... 402-N (generally, "the lookup-table set 402," collectively, "the lookup-table sets 402."). Each set of the lookup-table sets 402 includes a stack of lookup tables 404, where each of the lookup tables 404 may include model parameters of one optical input power ($P_{opt}$) similar to the lookup tables 302. Each set of the lookup-table sets 402 is assembled according to one particular process and temperature condition (e.g., (PROCESS I, TEMP. I) ... (PROCESS N, TEMP. N)). Each of those process conditions may indicate a process corner of a semiconductor wafer and an operating temperature of the PD.

Figure 4B:
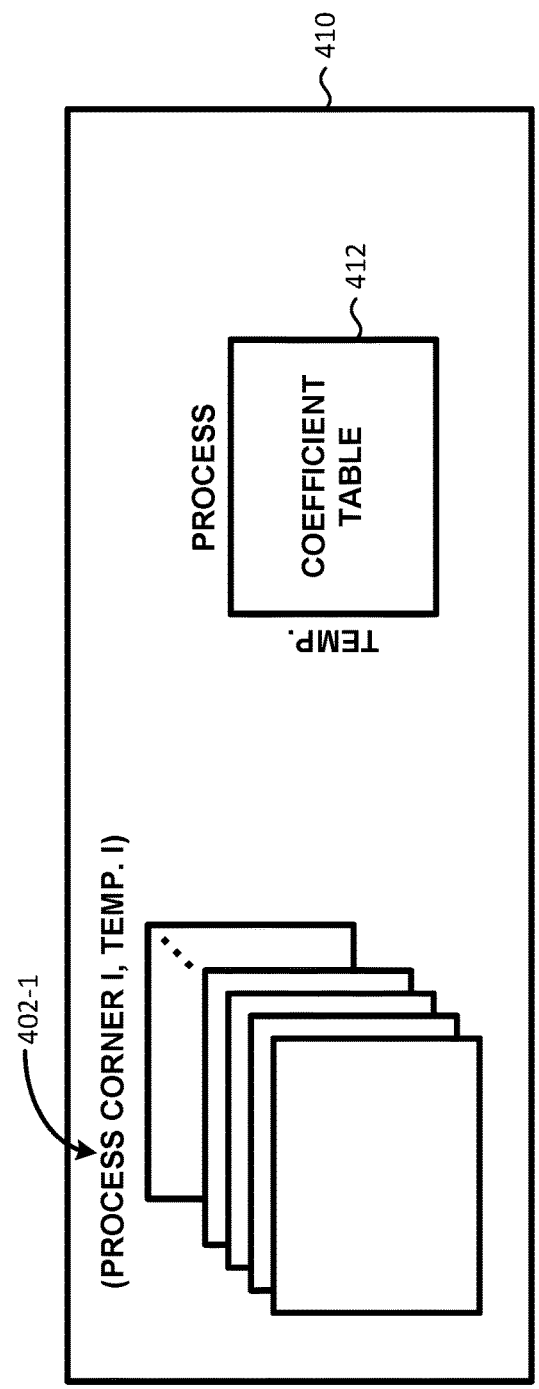
FIG. 4B is a diagram illustrating an example lookup-table library that includes a set of lookup tables and a coefficient table indicative process and temperature variations, according to an example embodiment.

In other embodiments, a coefficient table that represents process and temperature variations may be provided in a LUT library, as shown in FIG. 4B. FIG. 4B is a diagram illustrating an example LUT library 410 that includes a set 402-1 of lookup tables for a particular process and temperature condition (e.g., (PROCESS I, TEMP. I)) and a coefficient table 412. The coefficient table 412 may be obtained by calculating a coefficient between the set 402-1 of lookup tables and any other one of the lookup-table sets 402 of FIG. 4A. For example, when the process and temperature condition (PROCESS N, TEMP. N) is called for in a PD behavior simulation, the set 402-1 of lookup tables and a coefficient from the coefficient table 412 that represents the correspondence between the set 402-1 and the set 402-N may be obtained to calculate lookup tables for the process and temperature condition (PROCESS N, TEMP. N).

In some embodiments, once four parameters ($P_{opt}$, $V_R$, Process, Temp.) are entered by PDK users, model parameters and coefficients corresponding to the entered conditions are automatically searched within the LUT library (e.g., the LUT library 202, 400, or 410) for the level decision part 206, the OLE conversion part 208, and the electrical parasitics part 210.

Figure 5:
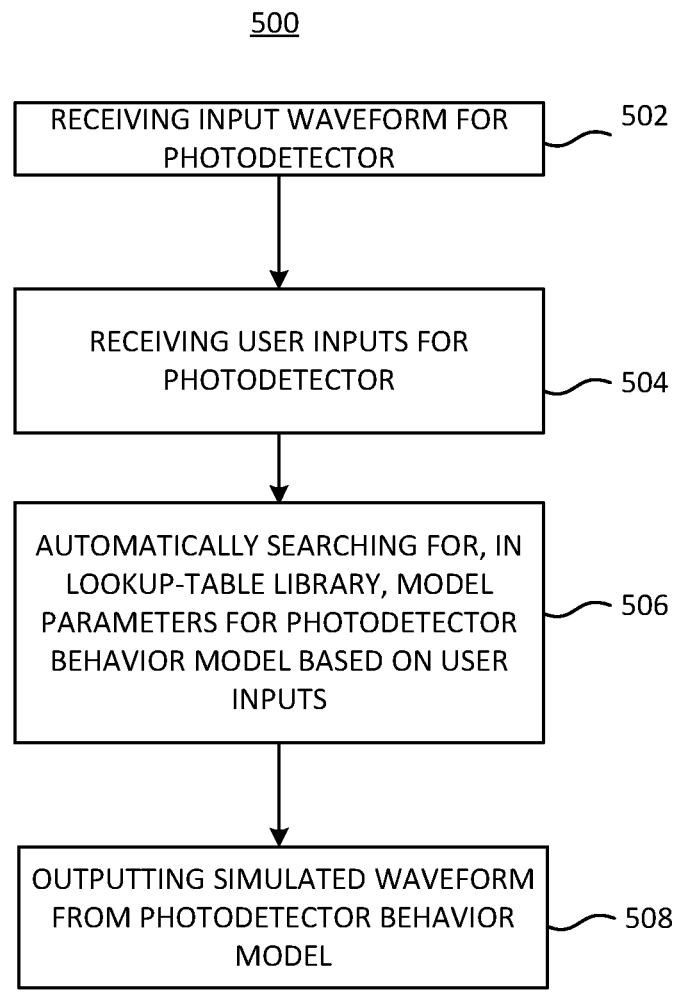
FIG. 5 is a flow chart illustrating a method for simulating an electrical response of a photodetector receiving an optical signal, according to one example embodiment.

Reference is now made to FIG. 5. FIG. 5 is a flow chart illustrating a method 500 for simulating an electrical response of a photodetector receiving an optical signal, according to one example embodiment. For example, the method 500 may be performed by a PD behavior simulation apparatus that includes one or more processors and a memory configured with computer-executable instructions for performing the method 500. At 502, the PD behavior simulation apparatus receives an input waveform for an photodetector under simulation. The input waveform (e.g., input waveform 220) may be a modulated optical signal. In some embodiments, the input waveform may be a digitized and/or normalized waveform.

At 504, the PD behavior simulation apparatus receives user inputs including an input optical power and a reverse bias voltage for the photodetector. In some embodiments, a user of the PD behavior simulation apparatus may be presented with a user interface on a display screen to allow the user to input initial parameters for the simulation. For example, the user may be required to at least enter an input optical power and a reverse bias voltage for the photodetector under simulation. In some instances, the user is only required to enter these two parameters for the PD behavior simulation apparatus to generate a simulation result. In various embodiments, the user interface may also allow the user to select and/or enter other parameters. For example, the user interface may include conditions for a process corner of a wafer and an operating temperature for the user to select and/or enter. As explained above, including process and temperature conditions in the simulation can allow a user to verify reliability of the PD.

At 506, based on the user inputs, the PD behavior simulation apparatus automatically searches for, in a lookup-table library (e.g., the LUT library 202, 400, or 410 of FIG. 2, 4A, or 4B), model parameters for a photodetector behavior model. For example, based on the user inputs of a reverse bias voltage and an input optical power, the PD behavior simulation apparatus can search for model parameters for the photodetector behavior model to perform the simulation of the photodetector. The lookup-table library may include one or more lookup tables that are organized based on reverse bias voltages and input optical powers, such as those shown in FIG. 3. In some embodiments, the photodetector behavior model may take into consideration the process and temperature conditions to generate a simulation result for the photodetector and to verify effects of process and temperature variations. Thus, the user inputs may further include the process and temperature conditions. Based on the reverse bias voltage, the input optical power, and the process and temperature conditions, the PD behavior simulation apparatus can automatically search in a lookup-table library (e.g., the LUT library 400 or 410 of FIG. 4A or 4B) model parameters for the photodetector behavior model.

The PD behavior simulation apparatus provides the model parameters to the photodetector behavior model to enable the photodetector behavior model to simulate an electric response for the photodetector. In some embodiments, the photodetector behavior model may include a level decision part/algorithm, an O/E conversion part/algorithm, and an electrical parasitics part/algorithm. The PD behavior simulation apparatus is configured to provide appropriate model parameters for each of those parts. In some embodiments, the level decision part is configured to obtain an input waveform and determine a DC current level for the photodetector under simulation. The optical-electrical conversion part is configured to determine photo-generated carriers of the photodetector based on the DC current level, input optical power, the reverse bias voltage, and the model parameters. The electrical parasitics part is configured to determine electrical parasitics for the photodetector. After these calculations, at 508 the PD behavior simulation apparatus outputs a simulated electrical response (e.g., electrical currents) of the photodetector, where the simulated electrical response being indicative of an electrical response of the photodetector receiving the input waveform.

Figure 6:
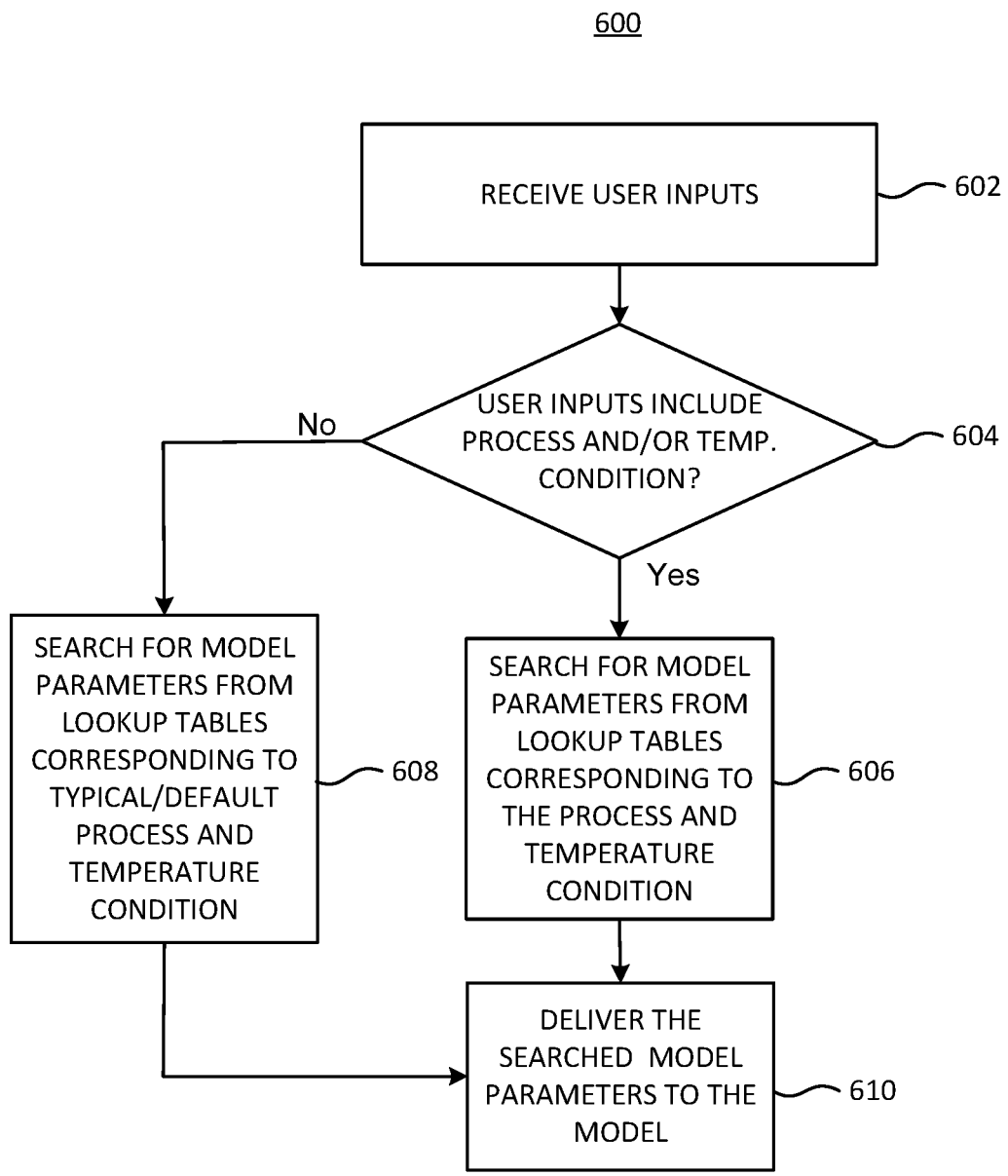
FIG. 6 is a flow chart illustrating a method for automatically searching a lookup-table library to find correct model parameters for a photodetector behavior model to simulate an electrical response of a photodetector, according to one example embodiment.

FIG. 6 is a flow chart illustrating a method 600 for automatically searching a lookup-table library to find correct model parameters for a PD behavior model to simulate an electrical response of a photodetector, according to one example embodiment. For example, the method 600 may be performed by a PD behavior simulation apparatus that includes one or more processors and a memory configured with computer-executable instructions for performing the method 600. At 602, the PD behavior simulation apparatus receives user inputs to the PD behavior model. At 604, the PD behavior simulation apparatus determines whether the user inputs include a process and temperature condition. The process and temperature condition indicates a process condition for manufacturing the PD and an operating temperature for the PD. If the PD behavior simulation apparatus determines that the user inputs include a process and temperature condition (Yes at 604), at 606, the PD behavior simulation apparatus searches for model parameters from lookup tables corresponding to the specified process and temperature condition. If the PD behavior simulation apparatus determines that the user inputs do not include a process and temperature condition (No at 604), at 608, the PD behavior simulation apparatus searches for model parameters from lookup tables corresponding to a typical/default process and temperature condition. Following 606 or 608, at 610 the PD behavior simulation apparatus delivers the searched model parameters to the PD behavior model, in a manner similar to the step 506 of FIG. 5.

The disclosed techniques may be implemented in a SiPh PDK that provides accurate and intuitive behavioral models with user-friendly interfaces. The techniques are advantageous over existing SiPh PDK because the disclosed PD model makes it easy and efficient to simulate a PD behavior.

Figure 7:
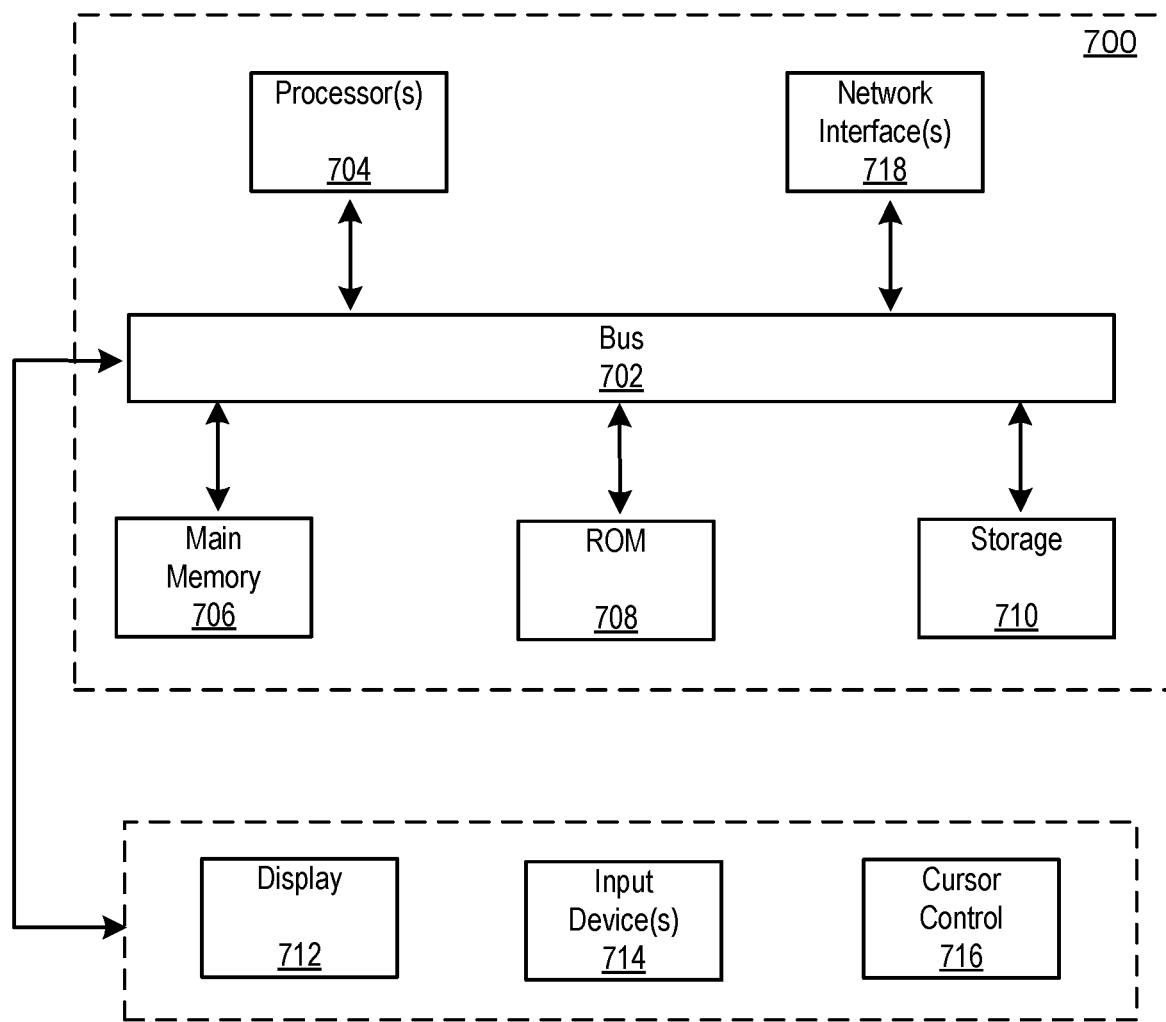
FIG. 7 depicts a block diagram of an example photodetector behavior simulation apparatus in which various of the embodiments described herein may be implemented.

FIG. 7 depicts a block diagram of an example PD behavior simulation apparatus 700 in which various of the embodiments described herein may be implemented. The PD behavior simulation apparatus 700 includes a bus 702 or other communication mechanism for communicating information, one or more hardware processors 704 coupled with bus 702 for processing information. Hardware processor(s) 704 may be, for example, one or more general purpose microprocessors.

The PD behavior simulation apparatus 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render PD behavior simulation apparatus 700 into a special-purpose machine that is customized to perform the operations specified in the instructions.

The PD behavior simulation apparatus 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions. For example, the various instructions necessary for the methods 500 and 600 may be stored at one or more of the main memory 706, the ROM 708, and the storage 710. The LUT libraries 202, 400, and 410 may also be stored in one or more of the main memory 706, the ROM 708, and the storage 710. The processor 704 can execute the instructions stored at the main memory 706, the ROM 708, and the storage 710 to perform the techniques disclosed herein, including methods 500 and 600 of FIGS. 5 and 6.

The PD behavior simulation apparatus 700 may be coupled via bus 702 to a display 712, such as a liquid crystal display (LCD) (or touch screen), for displaying information (e.g. a user interface) to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The PD behavior simulation apparatus 700 may implement the techniques described herein using customized hard-wired logic, one or more ASICs or FPGAs, firmware and/or program logic which in combination with the computer system causes or programs PD behavior simulation apparatus 700 to be a special-purpose machine. According to one embodiment, the techniques herein are performed by PD behavior simulation apparatus 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The PD behavior simulation apparatus 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from PD behavior simulation apparatus 700, are example forms of transmission media.

The PD behavior simulation apparatus 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as PD behavior simulation apparatus 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for simulating photodetector behavior, the method comprising:
    receiving a modulated optical signal comprising an input waveform for a photodetector;
    receiving an input optical power and a reverse bias voltage for the photodetector;
    searching for, in a lookup-table library, model parameters for a photodetector behavior model responsive to receiving the input optical power and the reverse bias voltage, wherein the lookup-table library includes a plurality of lookup tables each of which is associated with a distinct optical power, and wherein searching for the model parameters comprises searching the look-up table library for a look-up table associated with an optical power corresponding to the input optical power and locating model parameters associated with a reverse bias voltage, in the look-up table, that corresponds to the received reverse bias voltage;
    responsive to locating the model parameters, executing a hardware behavior modeling language that determines a DC current level, photo-generated carriers, and electrical parasitics for the photodetector behavior model using the located model parameters;
    based on the DC current level, the photo-generated carriers, and the electrical parasitics, generating, using the photodetector behavior model, an electrical current representative of an electrical response of the photodetector, the electrical current comprising a second waveform indicative of an electrical response of the photodetector behavior of the photodetector;
    delivering the electrical current to a receiver front-end circuit.

2. The method of claim 1, wherein the photodetector behavior model comprises a level decision algorithm configured to obtain the input waveform and determine the DC current level for the photodetector.

3. The method of claim 2, wherein the photodetector behavior model further comprises an optical-electrical conversion algorithm configured to determine the photo-generated carriers of the photodetector based on the DC current level, input optical power, the reverse bias voltage, and the model parameters.

4. The method of claim 3, wherein the photodetector behavior model further comprises an electrical parasitics algorithm configured to determine the electrical parasitics of the photodetector.

5. The method of claim 1, wherein the lookup-table library is obtained by simulation of one or more photodetectors or measurement of one or more physical photodetectors.

6. The method of claim 1, wherein the model parameters for the photodetector include voltages up to an avalanche breakdown voltage of the photodetector.

7. The method of claim 1, wherein the lookup-table library includes a plurality of sets of lookup tables, each set of lookup tables comprising one or more lookup tables, and each set being organized based a manufacturing process and an operating temperature for the photodetector.

8. The method of claim 7, wherein the lookup-table library further includes a coefficient table storing coefficients for different manufacturing processes and operating temperatures for the photodetector.

9. The method of claim 1, wherein the model parameters comprises at least one of: a multiplication factor, a responsivity, a resonance frequency, a Q-factor, and parasitic capacitance for the photodetector behavior model.

10. A non-transitory computer-readable storage medium storing instructions executable by one or more processors to cause the one or more processors to perform operations including:
receiving a modulated optical signal comprising an input waveform for a photodetector;
receiving an input optical power and a reverse bias voltage for the photodetector;
searching for, in a lookup-table library, model parameters for a photodetector behavior model responsive to receiving the input optical power and the reverse bias voltage, wherein the lookup-table library includes a plurality of lookup tables each of which is associated with a distinct optical power, and wherein searching for the model parameters comprises searching the look-up table library for a look-up table associated with an optical power corresponding to the input optical power and locating model parameters associated with a reverse bias voltage, in the look-up table, that corresponds to the received reverse bias voltage;
responsive to locating the model parameters, executing a hardware behavior modeling language that determines a DC current level, photo-generated carriers, and electrical parasitics for the photodetector behavior model using the located model parameters; and
based on the DC current level, the photo-generated carriers, and the electrical parasitics, generating an electrical current using the photodetector behavior model, the electrical current comprising a second waveform indicative of an electrical response of the photodetector.

11. The non-transitory computer-readable storage medium of claim 10, wherein the photodetector behavior model comprises a level decision algorithm configured to obtain the input waveform and determine the DC current level for the photodetector.

12. The non-transitory computer-readable storage medium of claim 11, wherein the photodetector behavior model further comprises an optical-electrical conversion algorithm configured to determine the photo-generated carriers of the photodetector based on the DC current level, input optical power, the reverse bias voltage, and the model parameters.

13. The non-transitory computer-readable storage medium of claim 12, wherein the photodetector behavior model further comprises an electrical parasitics algorithm configured to determine the electrical parasitics of the photodetector.

14. The non-transitory computer-readable storage medium of claim 10, wherein the model parameters for the photodetector include voltages up to an avalanche breakdown voltage of the photodetector.

15. The non-transitory computer-readable storage medium of claim 10, wherein the lookup-table library includes a plurality of sets of lookup tables, each set of lookup tables comprising one or more lookup tables, and each set being organized based a manufacturing process and an operating temperature for the photodetector.

16. The non-transitory computer-readable storage medium of claim 15, wherein the lookup-table library further includes a coefficient table storing coefficients for different manufacturing processes and operating temperatures for the photodetector.

17. An apparatus, comprising:
one or more processors; and
a memory storing instructions executable by the one or more processors to cause the one or more processors to perform operations including:
receiving a modulated optical signal comprising an input waveform for a photodetector;
receiving an input optical power and a reverse bias voltage for the photodetector;
searching for, in a lookup-table library, model parameters for a photodetector behavior model responsive to receiving the input optical power and the reverse bias voltage, wherein the lookup-table library includes a plurality of lookup tables each of which is associated with a distinct optical power, and wherein searching for the model parameters comprises searching the look-up table library for a look-up table associated with an optical power corresponding to the input optical power and locating model parameters associated with a reverse bias voltage, in the look-up table, that corresponds to the received reverse bias voltage;
responsive to locating the model parameters, executing a hardware behavior modeling language that determines a DC current level, photo-generated carriers, and electrical parasitics for the photodetector behavior model using the located model parameters; and
based on the DC current level, the photo-generated carriers, and the electrical parasitics, generating an electrical current using the photodetector behavior model, the electrical current comprising a second waveform indicative of an electrical response of the photodetector.

18. The apparatus of claim 17, wherein the photodetector behavior model comprises a level decision algorithm configured to obtain the input waveform and determine the DC current level for the photodetector.

19. The apparatus of claim 18, wherein the photodetector behavior model further comprises an optical-electrical conversion algorithm configured to determine the the photo-generated carriers of the photodetector based on the DC current level, input optical power, the reverse bias voltage, and the model parameters.

20. The apparatus of claim 19, wherein the photodetector behavior model further comprises an electrical parasitics algorithm configured to determine the electrical parasitics of the photodetector.

* * * * *